May 4, 1954  D. L. SMART  2,677,789
GRID CONTROLLED RECTIFIER CIRCUIT ARRANGEMENT
Filed Aug. 14, 1950  2 Sheets-Sheet 1

*Inventor*
DAVID L. SMART
By *Babcock & Babcock*
*Attorney*

Patented May 4, 1954

2,677,789

UNITED STATES PATENT OFFICE 2,677,789

GRID CONTROLLED RECTIFIER CIRCUIT ARRANGEMENT

David Lorimer Smart, Stafford, England, assignor to The English Electric Company Limited, London, England, a British company Application August 14, 1950, Serial No. 179,208

Claims priority, application Great Britain August 24, 1949

11 Claims. (Cl. 315—252)

This invention relates to arc suppression in grid controlled rectifier circuits. In many cases it is desirable to employ a rectifier circuit in which the cathodes of the rectifiers are not at earth potential. For example, in the so-called three phase bridge or Graetz circuit, which has certain advantages, there are four different cathode potentials. Difficulties then arise in the use of grid control for arc suppression and an object of the invention is to provide such control in a convenient form.

Broadly the invention consists in feeding the grids through insulating transformers and providing an arc suppression relay device on the primary side of each such transformer, the arrangement being such that arc suppression may be achieved by interrupting the supply of energy to the insulating transformers.

According to a further feature of the invention an automatic bias circuit is provided whereby, on interrupting the grid supply, the grid is left with a negative bias persisting for a sufficient length of time to prevent further firing of the anode.

According to a still further feature of the invention a multi-phase rectifier is arranged to restart at a fraction of its maximum D. C. output voltage. This is achieved according to the invention by switches in the grid control or ignition or exciting circuits of the several rectifier tubes which go to make up the whole rectifier, the switches being arranged so that initially not all the tubes are put into service. The remainder of the tubes may then be switched in sequentially and the whole operation may be under the control of an automatic motor-operated controller arranged if desired to perform a sequence of switching operations each time the rectifier is restarted.

The invention further provides an improved circuit for high speed operation of relays. This is very desirable for arc suppression and comprises a circuit including the operating coil of a relay, a condenser charged to a higher voltage than that on which the relay is normally intended to operate, and switching means for completing the circuit through said condenser and the operating coil of the relay. In a preferred form of this feature, switching means is constituted by an electronic switch, for example, a thyratron valve.

Figure 1:
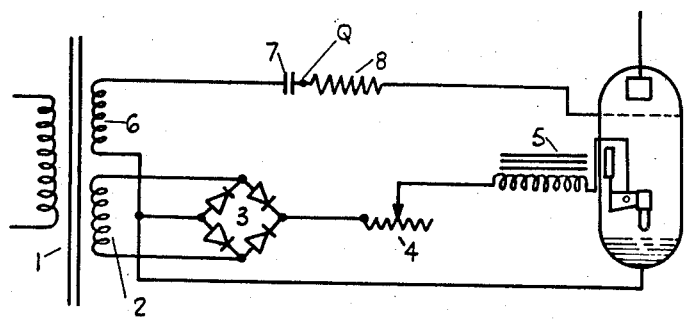
Figure 2:
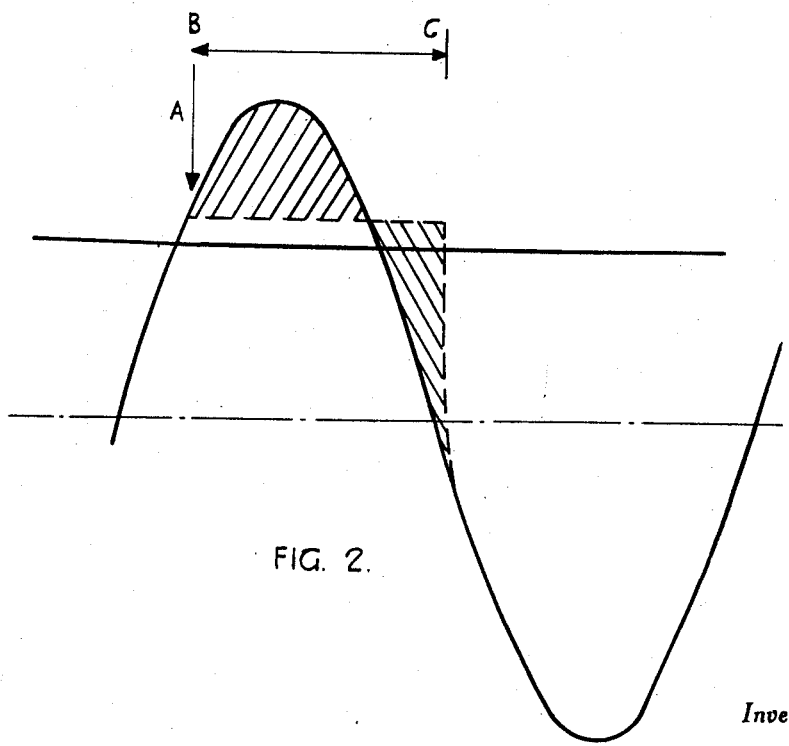

It will be convenient to consider in detail firstly a circuit which may be used to ensure that a negative bias is left on a grid after the corresponding grid supply transformer is disconnected. Such a circuit is shown in Fig. 1 of the accompanying drawings and Fig. 2 shows the voltage conditions in the grid circuit with respect to the cathode, taken at point Q in the circuit of Fig. 1. When the grid fires the bias will adjust itself to a value to maintain the forward and reverse grid currents equal. The rectifier is of the excitron type and is provided with a grid and excitation supply transformer 1, the secondary winding 2 of which provides power for the excitation arc through a rectifier 3, an adjusting resistance 4 and an igniting relay and choke 5. The other secondary winding 6 is connected to the cathode at one end and at the other end through a condenser 7 and resistance 8 to the grid. When the transformer 1 is energized the grid voltage varies with respect to the cathode as shown by the curve in Fig. 2, the grid firing at point A and the anode between points B and C. The areas between the dotted line and the voltage curve indicate forward and reverse grid currents. Since the grid can function as an anode a D. C. voltage will be produced between cathode and grid in normal operation which will maintain a charge on the condenser 7, and when the supply to the transformer 1 is interrupted, the condenser 7 will remain charged and will provide a negative bias on the grid as indicated by the chain-dotted line in Fig. 2. The size of the condenser is so chosen that the bias persists at least until the excitation current dies away. The anode will thus be prevented from further firing. Phase variations may be impressed in any suitable manner on the primary of the transformer 1 for grid control of voltage. An alternative arrangement is to use a rectifier across the condenser and transformer secondary combination so that bias builds up more quickly on switching on. This may sometimes be necessary so that a fault which exists at the moment of switching on may be cleared.

Figure 3:
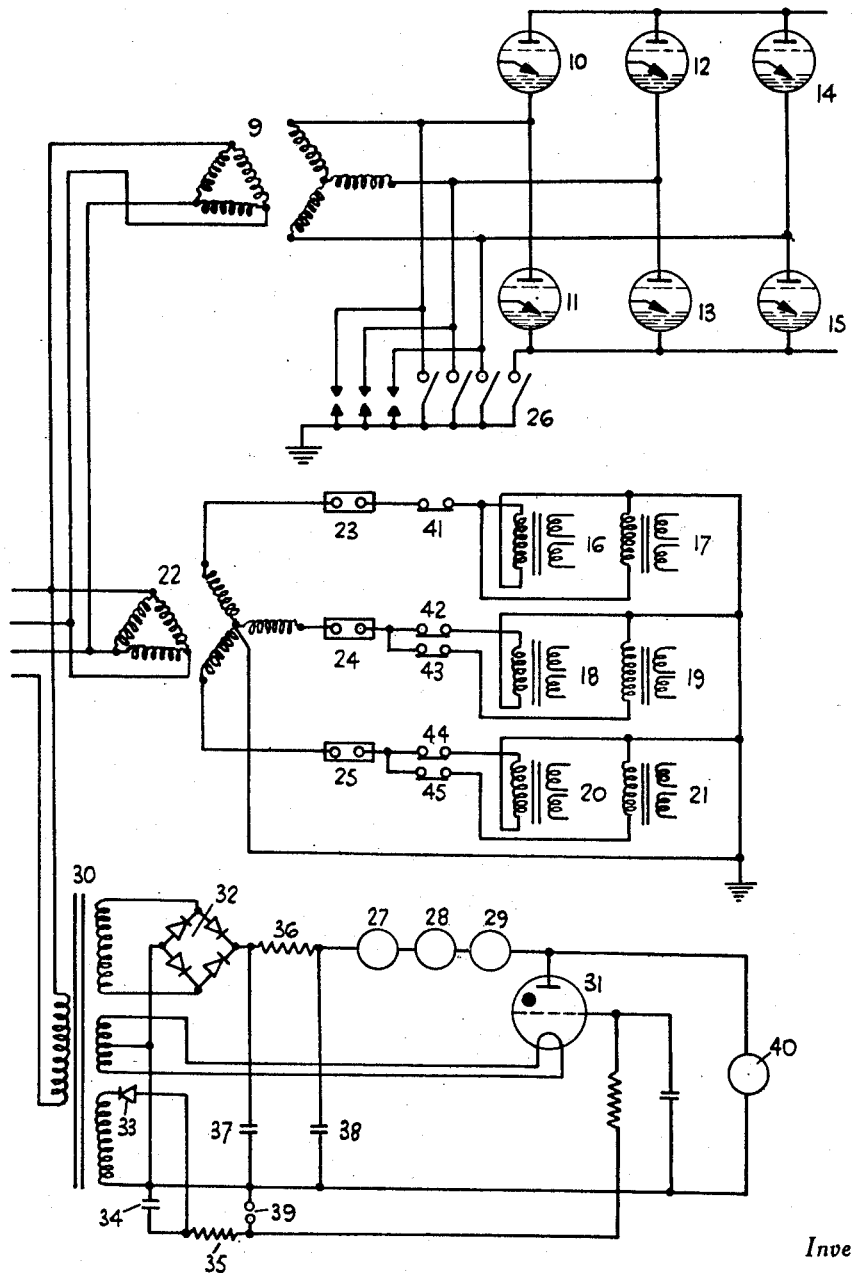

Referring now to Fig. 3 which shows diagrammatically the essentials of a complete three-phase rectifier system, a main transformer 9 supplies Graetz connected rectifiers 10, 11, 12, 13, 14 and 15. The cathodes of these rectifiers are at various high potentials and it thus presents a difficult insulation problem to provide arc suppression by grid control relays in the event of a fault. The circuit of Fig. 1 is repeated six times, but for simplicity only the insulating transformers of these circuits are shown. The six insulating transformers are indicated at 16, 17, 18, 19, 20 and 21, and serve to feed the grids and excitation arcs of the rectifiers 10–15 respectively from the main supply circuit. Control may therefore be exercised on the grids of the rectifiers through the primaries of the insulating transformers without the necessity for insulating the control apparatus for the cathode voltages. The insulating transformers are in this case fed in pairs from an insolating transformer 22 and each pair is under the control of one of the sets of main relay contacts 23, 24 and 25. These contacts are arranged to operate automatically on the occurrence of a fault. Grid control of voltage may be applied in several ways, for example impulse control may be used, in which case the insulating transformers are impulse transformers, or the insulating transformer may feed an impulse generating circuit on the high potential side, or as previously mentioned, the supply to the insulating transformers may be changed in phase in known ways.

The contacts 23, 24 and 25 are operated by a relay or relays 27, 28 and 29. It is very desirable to ensure rapid operation of these relays and to that end a special circuit which forms a feature of the invention is used. This circuit comprises a supply transformer 30 fed from neutral and one phase of the main supply and feeding a thyratron valve 31. The anode voltage of the valve 31 is supplied by a rectifier 32 and smoothing condenser 37 and bias is supplied to its grid by a rectifier 33 through a smoothing circuit consisting of a condenser 34. In series with the anode supply there is a current limiting resistance 36 and storage condensers 38. The coils of the relays 27, 28 and 29 are also in series with the anode supply. In normal conditions, therefore, with the valve 31 not conducting, the relays 27, 28 and 29 are not energized and their contacts 23, 24 and 25 are consequently closed. High speed fault detecting relays, however, are arranged with their contacts connected across the grid supply circuit of the valve 31 as shown at 39. Closure of these contacts results in the valve 31 becoming conducting and the condenser 38 which has become charged to a high voltage during the period when the valve 31 was not conducting, is thus enabled to discharge through the operating coils of the relays 27, 28 and 29 so that they receive a sudden surge of current and operate within a very few milliseconds of the occurrence of a fault. Although not shown on the drawing, it is convenient to use more than one pair of contacts on each of the relays 27, 28 and 29 and to connect these in series and connect a condenser in parallel with each pair of contacts. This makes it possible to interrupt the current at any time in the cycle, and not only at a time of current zero. It is of course not absolutely essential to use the arrangement just described and it would be possible to make use of multiple contact high speed fault detecting relays for disconnecting the supply to the insulating transformers. Another alternative is to use the contacts of a fault detecting relay to replace the valve 31.

A relay 40, the resistance of which is high so that it does not cause operation of the relays 27, 28 and 29, may be connected across the anode and cathode of the valve 31 and, on the valve becoming conducting, operates to initiate a complete cycle of a motor driven camshaft which resets the relays and operates contacts 41, 42, 43, 44 and 45 in sequence for restarting the rectifiers. Thus the contacts 41 and 42 are first closed to start the rectifiers 10, 11 and 12. In this condition the D. C. voltage output will be one-third of full voltage. Then the camshaft closes contacts 43 so that the rectifier 13 is started, the D. C. voltage now becoming two-thirds of full voltage. Contacts 44 are then closed to start the rectifier 14, giving five-sixths of full voltage, and finally contacts 45 are closed bringing the camshaft, which is then stopped, back to the original full voltage position with all the rectifiers firing. If desired the camshaft may be arranged to be stopped at any of its intermediate positions to provide a continuous condition of intermediate voltage.

It will be apparent that the above voltage changes could also be achieved by phase control on the grids of the rectifiers, but the above arrangement is particularly convenient. For some applications an intermediate voltage, for example, five-sixths of full voltage, may be required while preserving the same ripple frequency of the smoothed D. C. output, and in this case it is convenient for the five-sixths voltage step to be subject to phase control, while any other necessary intermediate voltages are provided by switching.

It is, of course, also possible to use the same system of obtaining voltage steps on a single phase bridge connection giving half and full voltage with three and four rectifiers operating, or on a normal three or six phase multi-anode rectifier connection.

What I claim as my invention and desire to secure by Letters Patent is:

1. A multi-phase grid controlled rectifier comprising a plurality of vapour discharge devices, each having a cathode, a control grid and an anode, an insulating transformer associated with each such device for supplying control energy to said grid, and means operative to interrupt the supply of energy to the primary of said transformer so as to achieve arc suppression, wherein a switch is provided in the primary circuit of at least some of the insulating transformers, said switches being arranged for sequential closure on starting of the rectifier so as to provide an output voltage increasing in a number of steps.

2. The invention as defined in claim 1, wherein a penultimate voltage step is obtained by phase-control with all the discharge devices operating.

3. A multi-phase grid controlled rectifier comprising a plurality of vapour discharge devices, each having a cathode, a control grid and an anode, an insulating transformer associated with each such device for supplying control energy to said grid, arc suppression means operative to interrupt the supply of energy to the primary of said transformer, and storage means, associated with the secondary circuit of said transformer and conditioned by normal operation of the rectifier, effective, on said supply of energy being interrupted, to impress on said grid a negative voltage with respect to said cathode of such value and duration as to prevent further firing of said anode, wherein said arc suppression means includes a relay, the operating coil of which is fed from a direct current source of a higher voltage than the normal operating voltage of the coil, the capacitor being arranged to be charged from said source through a current limiting device, and means are provided for connecting said coil across said capacitor on the occurrence of a fault.

4. The invention as defined in claim 3, wherein a switch is provided in the primary circuit of at least some of the insulating transformers, said switches being arranged for sequential closure on starting of the rectifier so as to provide an output voltage increasing in a number of steps.

5. The invention as defined in claim 4, wherein a penultimate voltage step is obtained by phase-control with all the discharge devices operating.

6. A multi-phase grid-controlled rectifier comprising a plurality of vapour discharge devices, each having a cathode, a control grid, an anode and an auxiliary electrode for continuous excitation, an insulating transformer associated with each such device for supplying energy for excitation and for grid control, arc suppression means operative to interrupt the supply of energy to the primary of said transformer, and a series capacitor, in that secondary circuit of said transformer which supplies energy to said grid, of such value as to maintain said grid so negative with respect to said cathode and for such duration as to prevent further firing at least until the excitation current dies away, wherein a switch is provided in the primary circuit in at least some of the insulating transformers, said switch being arranged for sequential closure on starting of the rectifier so as to provide an output voltage increasing in a number of steps.

7. The invention as defined in claim 6, wherein a penultimate voltage step is obtained by phase-control with all the discharge devices operating.

8. A multi-phase grid-controlled rectifier comprising a plurality of vapour discharge devices, each having a cathode, a control grid and an anode, an insulating transformer associated with each such device for supplying control energy to said grid, and arc suppression means operative to interrupt the supply of energy to the primary of said transformer, and a series capacitor, in the secondary circuit of said transformer, of such value as to maintain said grid so negative with respect to said cathode and for such duration as to prevent further firing, wherein a switch is provided in the primary circuit of at least some of the insulating transformers, said switches being arranged for sequential closure on starting of the rectifier so as to provide an output voltage increasing in a number of steps.

9. The invention as defined in claim 8, wherein a switch is provided in the primary circuit of at least some of the insulating transformers, said switches being arranged for sequential closure on starting of the rectifier so as to provide an output voltage increasing in a number of steps.

10. The invention as defined in claim 8, wherein a penultimate voltage step is obtained by phase-control with all the discharge devices operating.

11. The invention as defined in claim 8, wherein a penultimate voltage step is obtained by phase-control with all the discharge devices operating.

References Cited in the file of this patent

UNITED STATES PATENTS

| Number | Name | Date |
|---|---|---|
| 1,691,395 | Langmuir | Nov. 13, 1928 |
| 1,787,299 | Alexanderson | Dec. 20, 1930 |
| 2,088,436 | Reid | July 27, 1937 |
| 2,114,828 | Bedford | Apr. 19, 1938 |
| 2,515,989 | Cox et al. | July 18, 1950 |